United States Patent
Zhang et al.

(10) Patent No.: US 11,552,286 B2
(45) Date of Patent: Jan. 10, 2023

(54) LITHIUM-ION BATTERY

(71) Applicant: CONTEMPORARY AMPEREX TECHNOLOGY CO., LIMITED, Ningde (CN)

(72) Inventors: Manfang Zhang, Ningde (CN); Shengwei Wang, Ningde (CN); Fuping Luo, Ningde (CN); Xinxin Du, Ningde (CN); Qiaoge Wang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 274 days.

(21) Appl. No.: 16/449,196

(22) Filed: Jun. 21, 2019

(65) Prior Publication Data

US 2020/0006750 A1    Jan. 2, 2020

(30) Foreign Application Priority Data

Jun. 29, 2018 (CN) .......................... 201810696221.5

(51) Int. Cl.
| | | |
|---|---|---|
| *H01M 4/133* | (2010.01) | |
| *H01M 4/131* | (2010.01) | |
| *H01M 4/505* | (2010.01) | |
| *H01M 4/525* | (2010.01) | |
| *H01M 4/80* | (2006.01) | |
| *H01M 10/0525* | (2010.01) | |
| *H01M 4/02* | (2006.01) | |

(52) U.S. Cl.
CPC .......... *H01M 4/133* (2013.01); *H01M 4/131* (2013.01); *H01M 4/505* (2013.01); *H01M 4/525* (2013.01); *H01M 4/80* (2013.01); *H01M 10/0525* (2013.01); *H01M 2004/027* (2013.01); *H01M 2004/028* (2013.01)

(58) Field of Classification Search
CPC combination set(s) only.
See application file for complete search history.

(56) References Cited

U.S. PATENT DOCUMENTS

| | | | | |
|---|---|---|---|---|
| 2003/0134200 A1* | 7/2003 | Tanaka | .................. | H01M 4/485 429/231.95 |
| 2010/0019194 A1* | 1/2010 | Fujiwara | ................ | H01M 4/131 252/182.1 |
| 2015/0086840 A1* | 3/2015 | Takami | .................. | H01M 4/505 429/223 |
| 2015/0372304 A1* | 12/2015 | Hasegawa | ........... | H01M 4/1391 429/231.95 |

FOREIGN PATENT DOCUMENTS

| | | | |
|---|---|---|---|
| CN | 104577188 A | | 4/2015 |
| CN | 104779413 A | * | 7/2015 |
| CN | 104953178 A | | 9/2015 |
| CN | 105119019 A | | 12/2015 |
| CN | 105591158 A | | 5/2016 |
| CN | 105895876 A | | 8/2016 |
| CN | 106505249 A | | 3/2017 |
| CN | 107195960 A | | 9/2017 |
| CN | 107275553 A | * | 10/2017 |
| EP | 1650826 A1 | | 4/2006 |
| EP | 1916734 A1 | | 4/2008 |
| WO | WO2015/037522 A1 | | 3/2015 |

OTHER PUBLICATIONS

English translation of CN107275553A (Chen) (Year: 2017).*
English translation of CN-104779413-A (Ye Baiqing) (Year: 2015).*
Contemporary Amperex Technology Co., Limited, Chinese First Office Action CN201810696221.5, dated Mar. 20, 2020, 9 pgs.
Contemporary Amperex Technology Co., Limited, Extended European Search Report EP19178046.9, dated Nov. 12, 2019, 7 pgs.
Contemporary Amperex Technology Co., Limited, Second Office Action, CN201810696221.5, dated Aug. 20, 2020, 8 pgs.

* cited by examiner

*Primary Examiner* — Ula C Ruddock
*Assistant Examiner* — Sarika Gupta
(74) *Attorney, Agent, or Firm* — Morgan, Lewis & Bockius LLP

(57) ABSTRACT

The present disclosure provides a lithium-ion battery, the lithium-ion battery comprises a positive electrode plate, a negative electrode plate, a separator and an electrolyte. The positive active material comprises a material having a chemical formula of $Li_aNi_xCo_yM_zO_2$, the negative active material comprises a graphite-type carbon material, the lithium-ion battery satisfies a relationship $58\% \leq KY_a/(KY_a+KY_c) \times 100\% \leq 72\%$. In the present disclosure, by reasonably matching the relationship between the anti-compression capability of the positive active material and the anti-compression capability of the negative active material, it can make the positive electrode plate and the negative electrode plate both have good surface integrity, and in turn make the lithium-ion battery have excellent dynamics performance and excellent cycle performance at the same time.

14 Claims, No Drawings

LITHIUM-ION BATTERY

CROSS-REFERENCE TO RELATED APPLICATIONS

The present application claims priority to Chinese patent application No. CN201810696221.5, filed on Jun. 29, 2018, which is incorporated herein by reference in its entirety.

FIELD OF THE PRESENT DISCLOSURE

The present disclosure relates to the field of battery, and particularly relates to a lithium-ion battery.

BACKGROUND OF THE PRESENT DISCLOSURE

With the increasing popularity of electric automotives, people have a more and more strict requirement on a battery used in the electric automotive, for example, the battery needs to be small and light, and moreover, the battery must have high capacity, long cycle life and high safety performance. Therefore technical staffs have performed a lot of efforts from various aspects of the battery such as a positive electrode plate, a negative electrode plate, an electrolyte and the like.

For example, from the viewpoint of a positive active material of the battery, a ternary positive active material has a higher capacity per gram and a higher compaction density compared to a lithium iron phosphate, therefore the battery using the ternary positive active material has a higher energy density. However, the ternary positive active material has smaller volume shrinkage during the cycle process, the positive electrode plate will squeeze the negative electrode plate and destroy the surface of the positive electrode plate and the surface of the negative electrode plate, thereby resulting in failure of the battery. Therefore, although the energy density of the battery using the ternary positive active material is higher, the cycle life of the battery using the ternary positive active material usually is worse.

In view of this, providing a battery having excellent performances on various aspects is still a technical problem in the field that needs to be solved urgently and is also difficult to be solved.

SUMMARY OF THE PRESENT DISCLOSURE

In view of the problem existing in the background, an object of the present disclosure is to provide a lithium-ion battery, which can make the positive electrode plate and the negative electrode plate both have good surface integrity, and also make the lithium-ion battery have excellent dynamics performance and excellent cycle performance at the same time.

In order to achieve the above object, the present disclosure provides a lithium-ion battery, which comprises a positive electrode plate, a negative electrode plate, a separator and an electrolyte, the positive electrode plate comprises a positive current collector and a positive film, the positive film is provided on at least one surface of the positive current collector and comprises a positive active material, the negative electrode plate comprises a negative current collector and a negative film, the negative film is provided on at least one surface of the negative current collector and comprises a negative active material. The positive active material comprises a material having a chemical formula of $Li_aNi_xCo_yM_zO_2$, $0.95 \leq a \leq 1.2$, $x>0$, $y \geq 0$, $z \geq 0$, M is one or two selected from a group consisting of Mn and Al; the negative active material comprises a graphite-type carbon material; the lithium-ion battery satisfies a relationship $58\% \leq KY_a/(KY_a+KY_c) \times 100\% \leq 72\%$. $KY_a=10/\rho_a$, $\rho_a$ represents a compaction density of a powder of the negative active material under a pressure of 2000 kg, and a unit of $\rho_a$ is $g/cm^3$; $KY_c=10/\rho_c$, $\rho_c$ represents a compaction density of a powder of the positive active material under a pressure of 2000 kg, and a unit of $\rho_c$ is $g/cm^3$.

Preferably, $x+y+z=1$.

Preferably, the lithium-ion battery satisfies a relationship $60\% \leq KY_a/(KY_a+KY_c) \times 100\% \leq 70\%$. More preferably, the lithium-ion battery satisfies a relationship $62\% \leq KY_a/(KY_a+KY_c) \times 100\% \leq 68\%$.

The negative active material satisfies $5\ cm^3/g \leq KY_a \leq 8\ cm^3/g$. Preferably, the negative active material satisfies $5.56\ cm^3/g \leq KY_a \leq 6.64\ cm^3/g$.

The positive active material satisfies $3\ cm^3/g \leq KY_c \leq 4\ cm^3/g$. Preferably, the positive active material satisfies $3\ cm^3/g \leq KY_c \leq 3.40\ cm^3/g$.

An average particle size D50 of the positive active material is $2\ \mu m \sim 11\ \mu m$. Preferably, the average particle size D50 of the positive active material is $2.5\ \mu m \sim 6.7\ \mu m$.

An average particle size D50 of the negative active material is $6\ \mu m \sim 15.6\ \mu m$. Preferably, the average particle size D50 of the negative active material is $6\ \mu m \sim 12.9\ \mu m$.

A graphitization degree of the negative active material is $92\% \sim 96.2\%$. Preferably, the graphitization degree of the negative active material is $92.1\% \sim 95.0\%$.

A pressing density of the positive film is $3.1\ g/cm^3 \sim 3.5\ g/cm^3$.

A porosity of the positive film is $20\% \sim 30\%$.

A pressing density of the negative film is $1.3\ g/cm^3 \sim 1.7\ g/cm^3$.

A porosity of the negative film is $30\% \sim 40\%$.

Doping modification and/or coating modification are further performed on $Li_aNi_xCo_yM_zO_2$.

The positive active material further comprises one or more selected from a group consisting of lithium cobalt oxide, lithium nickel oxide, layered lithium manganese oxide, spinel lithium manganese oxide, spinel lithium nickel manganese oxide and polyanion-type positive active material.

At least a part of the positive active material is single particle.

The graphite-type carbon material is one or more selected from a group consisting of artificial graphite, natural graphite and modified graphite.

The negative active material further comprises one or more selected from a group consisting of soft carbon, hard carbon, carbon fiber, mesocarbon microbeads, silicon-based material, tin-based material and lithium titanate.

Compared with the existing technologies, the present disclosure at least includes the following beneficial effects: in the lithium-ion battery of the present disclosure, by reasonably matching the relationship between the anti-compression capability of the positive active material and the anti-compression capability of the negative active material, it can make the positive electrode plate and the negative electrode plate both have good surface integrity, and in turn make the lithium-ion battery have excellent dynamics performance and excellent cycle performance at the same time.

DETAILED DESCRIPTION

Hereinafter a lithium-ion battery according to the present disclosure is described in detail.

The lithium-ion battery of the present disclosure comprises a positive electrode plate, a negative electrode plate, a separator and an electrolyte, the positive electrode plate comprises a positive current collector and a positive film, the positive film is provided on at least one surface of the positive current collector and comprises a positive active material, the negative electrode plate comprises a negative current collector and a negative film, the negative film is provided on at least one surface of the negative current collector and comprises a negative active material. The positive active material comprises a material having a chemical formula of $Li_aNi_xCo_yM_zO_2$, $0.95 \leq a \leq 1.2$, $x>0$, $y \geq 0$, $z \geq 0$, and $x+y+z=1$, M is one or two selected from a group consisting of Mn and Al; the negative active material comprises a graphite-type carbon material; the lithium-ion battery satisfies a relationship $58\% \leq KY_a/(KY_a+KY_c) \times 100\% \leq 72\%$. $KY_a=10/\rho_a$, $\rho_a$ represents a compaction density of a powder of the negative active material under a pressure of 2000 kg, and a unit of $\rho_a$ is $g/cm^3$; $KY_c=10/\rho_c$, $\rho_c$ represents a compaction density of a powder of the positive active material under a pressure of 2000 kg, and a unit of $\rho_c$ is $g/cm^3$.

$KY_a$ represents an anti-compression index of the negative active material, $KY_c$ represents an anti-compression index of the positive active material. The larger the value of $KY_a$ is, the larger the anti-compression capability of the powder of the negative active material is; the larger the value of $KY_c$ is, the larger the anti-compression capability of the powder of the positive active material is.

Generally, the negative active material (such as the graphite-type carbon material) is prone to generate larger plastic deformation while being rolled, and the positive active material (such as $Li_aNi_xCo_yM_zO_2$) is not prone to generate plastic deformation while being rolled, however, particle break and crystal structure damage of the positive active material easily occur.

If the selected positive active material and the selected negative active material are not matched well and the proportion of the anti-compression capability of the negative active material is too small during the design of the lithium-ion battery, at this case, when the squeeze pressure performed on the negative electrode plate from the positive electrode plate increases during the cycle process of the lithium-ion battery, because the negative active material has smaller anti-compression capability, the negative active material has larger deformation under the larger squeeze pressure, the porosity of the negative electrode plate decreases, the infiltration of the electrolyte into the negative electrode plate is worse, the intercalation resistance and the deintercalation resistance with respect to the lithium ions to the negative electrode plate are larger; and moreover, the interface compatibility between the negative electrode plate and the electrolyte is also worse, the contact impedance on the surface of the negative electrode plate continues to increase, which hinders the transmission of the lithium ions between the positive electrode plate and the negative electrode plate, finally both the dynamics performance and the cycle performance of the lithium-ion battery are worse. Furthermore, when the anti-compression capability of the negative active material is smaller, the rebound capability of the negative active material particles in morphology is also worse, the damage of the surface of the negative active material and the exfoliation of the negative electrode plate easily occur, therefore the surface stability and the structural stability of the negative active material are worse, the surface stability and the structural stability of the negative electrode plate are also worse, and the lithium precipitation window and the cycle performance of the lithium-ion battery are also affected (that is the lithium precipitation window of the lithium-ion battery is easily narrowed, and the lithium metal is easily precipitated during the cycle process of the lithium-ion battery), and in serious cases there may be failure of the lithium-ion battery.

If the selected positive active material and the selected negative active material are not matched well and the proportion of the anti-compression capability of the negative active material is too large during the design of the lithium-ion battery, at this case, the anti-compression capability of the positive active material particle is worse, the probability of particle break of the positive active material and the probability of crystal structure damage of the positive active material increase during the cycle process of the lithium-ion battery, the surface integrity of the positive electrode plate is worse, which not only affects the capacity of the lithium-ion battery and accelerates the decay speed of the capacity of the lithium-ion battery during the cycle process, but also hinders the deintercalation and the intercalation of the lithium ions due to the crystal structure damage of the positive active material. And moreover, the worse the anti-compression capability of the positive active material is, the lower the porosity of the positive electrode plate is, the worse the infiltration of the electrolyte into the positive electrode plate is, the larger the intercalation resistance and the deintercalation resistance with respect to the lithium ions to the positive electrode plate during the cycle process of the lithium-ion battery are; and furthermore, the interface compatibility between the positive electrode plate and the electrolyte is worse, the contact impedance on the surface of the positive electrode plate continues to increase, which hinders the transmission of the lithium ions between the positive electrode plate and the negative electrode plate, finally both the dynamics performance and the cycle performance of the lithium-ion battery are worse.

In the lithium-ion battery of the present disclosure, by reasonably matching the relationship between the anti-compression capability of the positive active material and the anti-compression capability of the negative active material and making the proportion of the anti-compression capability of the negative active material be moderate (that is between 58% and 72%), it can avoid the expansion force inside the lithium-ion battery being dramatically increased, the surface stability of the positive electrode plate being worse, the surface stability of the negative electrode plate being worse, the infiltration of the electrolyte into the positive electrode plate being worse and the infiltration of the electrolyte into the negative electrode plate being worse due to the excessive squeeze between the positive electrode plate and the negative electrode plate, which not only improves the dynamics performance of the lithium-ion battery, but also significantly elongates the cycle life of the lithium-ion battery.

Preferably, the lithium-ion battery satisfies a relationship $60\% \leq KY_a/(KY_a+KY_c) \times 100\% \leq 70\%$.

More preferably, the lithium-ion battery satisfies a relationship $62\% \leq KY_a/(KY_a+KY_c) \times 100\% \leq 68\%$.

In the lithium-ion battery of the present disclosure, preferably, the negative active material satisfies $4 \text{ cm}^3/\text{g} \leq KY_a \leq 10 \text{ cm}^3/\text{g}$. More preferably, the negative active material satisfies $5 \text{ cm}^3/\text{g} \leq KY_a \leq 8 \text{ cm}^3/\text{g}$.

In the lithium-ion battery of the present disclosure, preferably, the positive active material satisfies 2 cm$^3$/g≤KY$_c$≤5 cm$^3$/g. More preferably, the positive active material satisfies 3 cm$^3$/g≤KY$_c$≤4 cm$^3$/g.

When the positive active material and the negative active material fall within the above preferred ranges thereof, both the anti-compression index of the positive active material and the anti-compression index of the negative active material are moderate, too large deformation on the positive active material and too large deformation on the negative active material will not occur during the cycle process of the lithium-ion battery, the expansion force inside the lithium-ion battery will not increase dramatically, the surface integrity of the positive electrode plate and the surface integrity of the negative electrode plate are better, the infiltration of the electrolyte into the positive electrode plate and the infiltration of the electrolyte into the negative electrode plate are good, thereby avoiding the dynamics performance and the cycle performance of the lithium-ion battery being worse due to the increase of the contact impedance on the surface of the positive electrode plate and the surface of the negative electrode plate and the hindrance on the transmission of the lithium ions between the positive electrode plate and the negative electrode plate.

In the lithium-ion battery of the present disclosure, doping modification and/or coating modification may be further performed on Li$_a$Ni$_x$Co$_y$M$_z$O$_2$.

The doping modification may be cation doping, anion doping or anion-cation complex doping, the purpose of the doping modification is to dope some cations, anions or complex ions into the crystal lattice of Li$_a$Ni$_x$Co$_y$M$_z$O$_2$ so as to reduce Li/Ni cation mixing, it is beneficial for reducing the first cycle irreversible capacity, making integrity of the layered structure of Li$_a$Ni$_x$Co$_y$M$_z$O$_2$ more complete, making the stability of the crystal structure of Li$_a$Ni$_x$Co$_y$M$_z$O$_2$ higher, and making the probability of particle break and the probability of crystal structure damage lower, in turn it is beneficial for improving the cycle performance and the thermal stability of the lithium-ion battery. The specific method of the doping modification is not limited, for example, a wet doping may be used in the coprecipitation stage of the precursor, or a dry doping may be used in the sintering stage.

Preferably, an element used in the cation doping may be one or more selected from a group consisting of Al, Zr, Ti, B, Mg, V, Cr, Zn and Y.

Preferably, an element used in the anion doping may be one or more selected from a group consisting of F, P and S, F is more preferable. F may not only promote the sintering of Li$_a$Ni$_x$Co$_y$M$_z$O$_2$ so as to make the structure of Li$_a$Ni$_x$Co$_y$M$_z$O$_2$ more stable, but also may stabilize the interface between Li$_a$Ni$_x$Co$_y$M$_z$O$_2$ and the electrolyte during the cycle process, therefore it is beneficial for improving the cycle performance of the lithium-ion battery.

Preferably, a total doping amount of the cations and the anions is not more than 20%.

The coating modification is to form a coating layer on the surface of Li$_a$Ni$_x$Co$_y$M$_z$O$_2$ so as to separate the electrolyte and Li$_a$Ni$_x$Co$_y$M$_z$O$_2$ and prevent the electrolyte from directly contacting Li$_a$Ni$_x$Co$_y$M$_z$O$_2$, which may reduce the side reactions between the electrolyte and Li$_a$Ni$_x$Co$_y$M$_z$O$_2$ to a large extent, reduce the dissolution of the transition metals inside Li$_a$Ni$_x$Co$_y$M$_z$O$_2$, and improve the electrochemical stability of Li$_a$Ni$_x$Co$_y$M$_z$O$_2$. The presence of the coating layer may also inhibit the collapse of the crystal structure of Li$_a$Ni$_x$Co$_y$M$_z$O$_2$ during the repeated charging and discharging process, reduce the probability of particle break and the probability of crystal structure damage, therefore it is beneficial for improving the cycle performance of the lithium-ion battery. The specific method of the coating modification is not limited, for example, a wet coating may be used in the coprecipitation stage of the precursor, or a dry coating may be used in the sintering stage.

Preferably, the coating layer may be one or more selected from a group consisting of a carbon layer, a graphene layer, an oxide layer, an inorganic salt layer and a conductive polymer layer. The oxide may be an oxide formed from one or more selected from a group consisting of Al, Ti, Mn, Zr, Mg, Zn, Ba, Mo and B; the inorganic salt may be one or more selected from a group consisting of Li$_2$ZrO$_3$, LiNbO$_3$, Li$_4$Ti$_5$O$_{12}$, Li$_2$TiO$_3$, LiTiO$_2$, Li$_3$VO$_4$, LiSnO$_3$, Li$_2$SiO$_3$, LiAlO$_2$, AlPO$_4$ and AlF$_3$; the conductive polymer may be polypyrrole (PPy), poly(3,4-ethylenedioxythiophene) (PEDOT) or polyamide (PI).

Preferably, a mass of the coating layer is not more than 20%.

Preferably, Li$_a$Ni$_x$Co$_y$M$_z$O$_2$ may be one or more specifically selected from a group consisting of LiNi$_{1/3}$Co$_{1/3}$Mn$_{1/3}$O$_2$ (NCM333), LiNi$_{0.5}$Co$_{0.2}$Mn$_{0.3}$O$_2$ (NCM523), LiNi$_{0.6}$Co$_{0.2}$Mn$_{0.2}$O$_2$ (NCM622), LiNi$_{0.8}$Co$_{0.1}$Mn$_{0.1}$O$_2$ (NCM811) and LiNi$_{0.85}$Co$_{0.15}$Al$_{0.05}$O$_2$.

In the lithium-ion battery of the present disclosure, the positive active material may further comprise one or more selected from a group consisting of lithium cobalt oxide (LiCoO$_2$), lithium nickel oxide (LiNiO$_2$), layered lithium manganese oxide (LiMnO$_2$), spinel lithium manganese oxide (LiMn$_2$O$_4$), spinel lithium nickel manganese oxide (LiNi$_x$Mn$_{2-x}$O$_4$, 0<x<2) and polyanion-type positive active material besides Li$_a$Ni$_x$Co$_y$M$_z$O$_2$. The polyanion-type positive active material may be phosphate polyanion-type positive active material, silicate polyanion-type positive active material and sulfate polyanion-type positive active material. The phosphate polyanion-type positive active material typically may be LiFePO$_4$, LiMnPO$_4$, LiVPO$_4$F and Li$_3$V$_2$(PO$_4$)$_3$; the silicate polyanion-type positive active material typically may be Li$_2$FeSiO$_4$, Li$_2$MnSiO$_4$, Li$_2$CoSiO$_4$ and Li$_2$NiSiO$_4$; the sulfate polyanion-type positive active material typically may be Li$_2$Fe$_2$(SO$_4$)$_3$ and LiFeSO$_4$F.

In the lithium-ion battery of the present disclosure, preferably, at least a part of the positive active material is single particle (it means non-agglomerated particle). The positive active material which is single particle may improve the whole pressing density and the extensibility of the positive electrode plate, and reduce the contact area between the positive active material and the electrolyte, reduce the occurrence of the side reactions at the interface between the positive active material and the electrolyte and reduce the amount of the gas to be generated in the lithium-ion battery, thereby further improving the cycle performance of the lithium-ion battery.

In the lithium-ion battery of the present disclosure, preferably, an average particle size D50 of the positive active material is 1 μm~15 μm. More preferably, the average particle size D50 of the positive active material is 2 μm~11 μm. When the average particle size of the positive active material is too small, the specific surface area of the positive active material usually is larger, the oxidation activity of the positive active material increases, the side reactions on the surface of the positive active material also increase, finally the gas generation caused by the decomposition of the electrolyte is serious; when the average particle size of the positive active material is too large, the diffusion path of the lithium ions in the positive active material with a large particle size is longer, and the resistance to be overcome with respect to the lithium ions during the diffusion process is larger, finally the crystal deformation and the volume expansion of the positive active material during the intercalation process of the lithium ions accumulate to make the intercalation process of the lithium ions gradually be more and more difficult. And when the particle size of the positive active material falls within the above preferred ranges thereof, the positive electrode plate can have better homogeneity, thereby avoiding the positive active material with too small particle size from affecting the performances of the lithium-ion battery by generating more side reactions with the electrolyte, and also avoiding the positive active material with too large particle size from affecting the performances of the lithium-ion battery by hindering the transmission of the lithium ions inside the positive active material particle.

In the lithium-ion battery of the present disclosure, preferably, a pressing density of the positive film is 3.0 g/cm$^3$~3.7 g/cm$^3$. When the pressing density of the positive film is controlled within the above range thereof, the positive active material particle may have good integrity, and the good electrical contact between the positive active material particles may be maintained. More preferably, the pressing density of the positive film is 3.1 g/cm$^3$~3.5 g/cm$^3$.

In the lithium-ion battery of the present disclosure, preferably, a porosity of the positive film is 10%~40%. When the porosity of the positive film is controlled within the above range thereof, the retention capability of the electrolyte into the positive film is better, the infiltration of the electrolyte into between the positive active material particles is good, the interface charge transfer impedance between the positive active material and the electrolyte is lower, thereby further improving the dynamics performance and the cycle performance of the lithium-ion battery. More preferably, the porosity of the positive film is 20%~30%.

In the lithium-ion battery of the present disclosure, the type of the positive current collector is not specifically limited and may be selected based on actual demands, for example, the positive current collector may be an aluminum foil, a nickel foil or a polymer conductive film, and preferably, the positive current collector is the aluminum foil.

In the lithium-ion battery of the present disclosure, the positive film further comprises a conductive agent and a binder, the type and the content of the conductive agent and the binder are not specifically limited and may be selected based on actual demands.

In the lithium-ion battery of the present disclosure, preferably, an average particle size D50 of the negative active material is 4 μm~20 More preferably, the average particle size D50 of the negative active material is 6 μm~18 When the average particle size of the negative active material is too small, the adhesion force between the negative active material particles is smaller, the adhesion force of the negative electrode plate is smaller, the exfoliation of the negative electrode plate easily occurs during the cycle process of the lithium-ion battery to decrease the capacity of the lithium-ion battery; when the average particle size of the negative active material is too large, the diffusion path of the lithium ions in the negative active material with a large particle size is longer, and the intercalation process of the lithium ions is slower.

In the lithium-ion battery of the present disclosure, preferably, a graphitization degree of the negative active material is 80%~99%. The higher the graphitization degree of the negative active material is, the higher the capacity of the lithium-ion battery is, but the interlayer space of the negative active material is narrowed, the volume expansion of the negative active material caused by the deintercalation and the intercalation of the lithium ions during the charging and discharging process of the lithium-ion battery increases, the surface integrity of the negative electrode plate is deteriorated; and moreover, the SEI membrane on the surface of the negative active material is continually destroyed and repaired, which consumes a large amount of lithium ions, therefore the improvement on the cycle performance of the lithium-ion battery is weakened. The lower the graphitization degree of the negative active material is, the lower the crystallinity degree of the negative active material is, the more the lattice defects of the negative active material is, the more easily the side reactions occur during the cycle process of the lithium-ion battery to decrease the capacity of the lithium-ion battery, therefore the improvement on the cycle performance of the lithium-ion battery is also weakened. When the graphitization degree of the negative active material falls within the above preferred range thereof, the negative active material may have good graphite crystal structure, and in turn the negative active material may have a regular graphite layered structure, which is more beneficial for the deintercalation and the intercalation of the lithium ions in the graphite layered structure of the negative active material. More preferably, the graphitization degree of the negative active material is 92%~98%.

Further preferably, when the average particle size D50 of the negative active material is 6 μm~18 μm and the graphitization degree of the negative active material is 92%~98%, the negative electrode plate is prone to have a high-elastic structure, when the squeeze pressure on the negative electrode plate from the positive electrode plate increases during the cycle process of the lithium-ion battery, the rebound capability of the surface of the high-elastic structured negative electrode plate squeezed by the positive electrode plate is stronger, which can avoid the surface of the negative electrode plate from being damaged by the squeeze of the positive electrode plate, and avoid the exfoliation of the negative electrode plate occurring, therefore the cycle performance of the lithium-ion battery can be further improved without compromising the energy density of the lithium-ion battery.

In the lithium-ion battery of the present disclosure, the graphite-type carbon material is one or more selected from a group consisting of artificial graphite, natural graphite and modified graphite. The negative active material may further comprise one or more selected from a group consisting of soft carbon, hard carbon, carbon fiber, mesocarbon microbeads, silicon-based material, tin-based material and lithium titanate besides the graphite-type carbon material. The silicon-based material may be one or more selected from a group consisting of elemental silicon, silicon oxide, silicon carbon composite and silicon alloy; the tin-based material may be one or more selected from a group consisting of elemental tin, tin oxide compound and tin alloy.

In the lithium-ion battery of the present disclosure, preferably, a pressing density of the negative film is 1.1 g/cm$^3$~1.9 g/cm$^3$. When the pressing density of the negative film is controlled within the above range thereof, the negative active material particle may have good integrity, and the good electrical contact between the negative active material particles may be maintained. More preferably, the pressing density of the negative film is 1.3 g/cm$^3$~1.7 g/cm$^3$.

In the lithium-ion battery of the present disclosure, preferably, a porosity of the negative film is 25%~50%. When the porosity of the negative film is controlled within the above range thereof, the retention capability of the electrolyte into the negative film is better, the infiltration of the electrolyte into between the negative active material particles is good, the interface charge transfer impedance between the negative active material and the electrolyte is lower, thereby further improving the dynamics performance and the cycle performance of the lithium-ion battery. More preferably, the porosity of the negative film is 30%~40%.

In the lithium-ion battery of the present disclosure, the type of the negative current collector is not specifically limited and may be selected based on actual demands, for example, the negative current collector may be a copper foil, a carbon coated copper foil or a polymer conductive film, and preferably, the negative current collector is the copper foil.

In the lithium-ion battery of the present disclosure, the negative film further comprises a conductive agent and a binder, the type and the content of the conductive agent and the binder are not specifically limited and may be selected based on actual demands.

In the lithium-ion battery of the present disclosure, the type of the separator is not specifically limited, and the separator may be any separator used in existing batteries, for example, the separator may be a polyethylene membrane, polypropylene membrane, a polyvinylidene fluoride membrane and a multilayer composite membrane thereof, but the present disclosure is not limited thereto.

In the lithium-ion battery of the present disclosure, the electrolyte comprises a lithium salt and an organic solvent, the specific type and the specific component of the lithium salt and the organic solvent are not specifically limited and may be selected based on actual demands. Preferably, the lithium salt may be one or more selected from a group consisting of lithium hexafluorophosphate, lithium tetrafluoroborate and lithium perchlorate; the organic solvent may comprise one or more selected from a group consisting of cyclic carbonate, chain carbonate and carboxylate. The electrolyte may also comprise functional additives, such as vinylene carbonate, ethylene sulfate, propane sultone, fluoroethylene carbonate and the like.

In the lithium-ion battery of the present disclosure, the parameters of the positive active material, the negative active material, the positive electrode plate and the negative electrode plate can be measured as follows, or measured according to other methods known in the art, and the obtained results are both within the error range.

(1) The Compaction Density of the Powder of the Positive/Negative Active Material Under a Pressure of 2000 kg Respectively putting a certain amount of positive/negative active material powders into a special mold, and then placing the special mold onto a powder compaction density instrument (for example FT-100F), setting the pressure to 2000 kg, a thickness of the powder is read, and the compaction density of the powder of the positive/negative active material under a pressure of 2000 kg may be obtained according to an equation $\rho=m/(S\times H)$, where $\rho$ represents a compaction density of the powder, m represents a mass of the powder, S represents a bottom area of the mold, and H represents a thickness of the powder after being compacted.

(2) The Average Particle Size D50 of the Positive/Negative Active Material

The average particle size D50 of the positive/negative active material may be obtained by a laser diffraction particle size analyzer (for example Mastersizer 3000), a particle size distribution is then obtained, and D50 represents a particle size corresponding to 50% of the volume particle size distribution of the positive/negative active material particles, that is the median value of the volume particle size distribution of the positive/negative active material particles.

(3) The Graphitization Degree of the Negative Active Material

The graphitization degree of the negative active material may be obtained by a X-ray powder diffractometer (for example X'pert PRO), an interlayer space of the graphite represented by $d_{002}$ is obtained according to the general rules for X-ray diffractometric analysis JIS K 0131-1996 and the determination method of graphite lattice parameter JB/T4220-2011, and the graphitization degree of the negative active material is then obtained according to an equation $G=(0.344-d_{002})/(0.344-0.3354)$.

(4) The Pressing Density of the Positive/Negative Film

The pressing density of the positive/negative film is obtained according to an equation PD=m/V, m represents a weight of the film, V represents a volume of the film. The weight of the film represented by m may be obtained by an electronic balance with an accuracy of 0.01 g or more, the volume of the film represented by V is a product of a surface area of the film and a thickness of the film, and the thickness of the film can be obtained by a spiral micrometer with an accuracy of 0.5 μm.

(5) The Porosity of the Positive/Negative Film

The porosity of the positive/negative film may be obtained by the gas replacement method, and the porosity of the positive/negative film is defined as $(V_1-V_2)/V_1\times 100\%$, where $V_1$ represents an apparent volume of the film, $V_2$ represents a real volume of the film.

Hereinafter the present disclosure will be described in detail in combination with examples. It should be noted that, the examples described in the present disclosure are only used for explaining the present disclosure, and are not intended to limit the scope of the present disclosure.

Lithium-ion batteries of examples 1-14 and comparative examples 1-6 were all prepared in accordance with the following preparation method.

(1) Preparation of a Positive Electrode Plate

The positive active material shown in table 1, acetylene black (conductive agent) and PVDF (binder) according to a mass ratio of 96:2:2 were uniformly mixed with NMP (solvent), which then became homogeneous under stirring via a vacuum mixer, a positive slurry was obtained; then the positive slurry was uniformly coated on a positive current collector, drying was then performed under room temperature and continual drying was performed in an oven, which was then followed by cold pressing and plate cutting, finally the positive electrode plate was obtained. A pressing density of the positive film was between 3.1 g/cm³ and 3.5 g/cm³, a porosity of the positive film was between 20% and 30%.

(2) Preparation of a Negative Electrode Plate

The negative active material shown in table 1, acetylene black (conductive agent), CMC (thickening agent) and SBR (binder) according to a mass ratio of 96.4:1:1.2:1.4 were uniformly mixed with deionized water (solvent), which then became homogeneous under stirring via a vacuum mixer, a negative slurry was obtained; then the negative slurry was uniformly coated on a negative current collector, drying was then performed under room temperature and continual drying was performed in an oven, which was then followed by cold pressing and plate cutting, finally the negative electrode plate was obtained. A pressing density of the negative film was between 1.3 g/cm³ and 1.7 g/cm³, a porosity of the negative film was between 30% and 40%.

(3) Preparation of an Electrolyte

Ethylene carbonate (EC), ethyl methyl carbonate (EMC) and diethyl carbonate (DEC) according to a volume ratio of 1:1:1 were mixed together to obtain an organic solvent, then sufficiently dried $LiPF_6$ (lithium salt) was dissolved into the mixed organic solvent to obtain an electrolyte, and a concentration of the electrolyte was 1 mol/L.

(4) Preparation of a Separator

The separator was a polyethylene membrane.

(5) Preparation of a Lithium-Ion Battery

The positive electrode plate, the separator and the negative electrode plate were laminated in order, the separator was positioned between the positive electrode plate and the negative electrode plate so as to separate the positive electrode plate from the negative electrode plate, then the positive electrode plate, the separator and the negative electrode plate were wound together to form an electrode assembly, then the electrode assembly was put into a case, which was followed by baking, electrolyte injection, vacuum packaging, standby, formation, shaping and the like, finally a lithium-ion battery was obtained.

negative electrode plates were disassembled from the lithium-ion batteries, and the lithium precipitation on the surface of each negative electrode plate was observed. The lithium-precipitation area of less than 5% was considered to be slight lithium precipitation, the lithium-precipitation area of 5% to 40% was considered to be moderate lithium precipitation, and the lithium-precipitation area of more than 40% was considered to be serious lithium precipitation.

(2) Test of the Cycle Performance

At 25° C., the lithium-ion batteries prepared in the examples and the comparative examples were charged at a constant current of 4 C and discharged at a constant current of 1 C, the fully charging and discharging process was repeated for 500 times, the cycle performance of the lithium-ion battery was characterize by a capacity retention rate of the lithium-ion battery after 500 cycles.

TABLE 1

Test results of examples 1-14 and comparative examples 1-6

| | Positive active material | | | Negative active material | | | | | |
|---|---|---|---|---|---|---|---|---|---|
| | Type | D50 (μm) | $KY_c$ (cm$^3$/g) | Type | D50 (μm) | Graphitization degree | $KY_a$ (cm$^3$/g) | $KY_a/(KY_a + KY_c)$ | Dynamics performance | Cycle performance |
| Example 1 | NCM523 | 2.1 | 4.02 | graphite | 12.9 | 96.2% | 5.56 | 58% | slight lithium precipitation | 92.1% |
| Example 2 | NCM523 | 2.5 | 3.70 | graphite | 12.9 | 96.2% | 5.56 | 60% | slight lithium precipitation | 93.2% |
| Example 3 | NCM523 | 6.7 | 3.40 | graphite | 12.9 | 96.2% | 5.56 | 62% | none lithium precipitation | 95.3% |
| Example 4 | NCM523 | 4.3 | 3.20 | graphite | 15.6 | 92.1% | 5.62 | 64% | none lithium precipitation | 96.5% |
| Example 5 | NCM523 | 4.3 | 3.20 | graphite | 11.5 | 95.0% | 6.30 | 66% | none lithium precipitation | 95.7% |
| Example 6 | NCM523 | 4.3 | 3.20 | graphite | 6.0 | 95.0% | 6.64 | 68% | none lithium precipitation | 95.6% |
| Example 7 | NCM523 | 4.3 | 3.20 | graphite | 11.3 | 94.5% | 7.45 | 70% | slight lithium precipitation | 95.4% |
| Example 8 | NCM523 | 3.5 | 3.06 | graphite | 9.9 | 96.0% | 7.71 | 72% | slight lithium precipitation | 91.8% |
| Example 9 | NCM523 | 4.3 | 3.20 | graphite | 5.0 | 94.1% | 6.12 | 66% | none lithium precipitation | 90.1% |
| Example 10 | NCM523 | 4.3 | 3.20 | graphite | 13.2 | 90.0% | 5.78 | 64% | none lithium precipitation | 91.6% |
| Example 11 | NCM622 | 4.4 | 3.25 | graphite | 15.0 | 94.4% | 5.35 | 62% | none lithium precipitation | 97.6% |
| Example 12 | NCM622 | 10.1 | 3.04 | graphite | 6.0 | 95.0% | 6.57 | 68% | none lithium precipitation | 96.8% |
| Example 13 | NCM811 | 9.6 | 3.22 | graphite | 15.0 | 94.4% | 5.35 | 62% | none lithium precipitation | 91.8% |
| Example 14 | NCM811 | 10.7 | 3.02 | graphite | 11.5 | 95.0% | 6.32 | 68% | none lithium precipitation | 91.4% |
| Comparative example 1 | NCM523 | 1.6 | 4.11 | graphite | 12.9 | 96.2% | 5.56 | 57% | moderate lithium precipitation | 89.1% |
| Comparative example 2 | NCM523 | 3.5 | 3.06 | graphite | 9.2 | 96.0% | 7.98 | 73% | moderate lithium precipitation | 89.5% |
| Comparative example 3 | NCM622 | 3.6 | 3.95 | graphite | 15.0 | 94.4% | 5.35 | 57% | moderate lithium precipitation | 88.7% |
| Comparative example 4 | NCM622 | 10.1 | 3.04 | graphite | 9.2 | 96.0% | 7.98 | 73% | moderate lithium precipitation | 89.1% |
| Comparative example 5 | NCM811 | 5.5 | 4.01 | graphite | 15.0 | 94.4% | 5.35 | 57% | moderate lithium precipitation | 86.2% |
| Comparative example 6 | NCM811 | 10.7 | 3.02 | graphite | 9.2 | 96.0% | 7.98 | 73% | moderate lithium precipitation | 87.8% |

Hereinafter test processes of the lithium-ion batteries were described.

(1) Test of the Dynamics Performance

At 25° C., the lithium-ion batteries prepared in the examples and the comparative examples were fully charged at a constant current of 4 C and fully discharged at a constant current of 1 C for 10 cycles, then the lithium-ion batteries were fully charged at a constant current of 4 C, then the In examples 1-14, when the lithium-ion battery was designed, by reasonably matching the relationship between the anti-compression capability of the positive active material and the anti-compression capability of the negative active material, the dramatic increase of the expansion force in the lithium-ion battery caused by the excessive squeeze between the positive electrode plate and the negative electrode plate might be avoided, both the positive electrode plate and the negative electrode plate had good structural integrity and good electrolyte infiltration capability, which not only improved the dynamics performance of the lithium-ion battery, but also significantly elongated the cycle life of the lithium-ion battery.

In comparative examples 1-6, the proportion of the anti-compression capability of the negative active material was too small or too large, therefore it was not beneficial for obtaining a lithium-ion battery having excellent dynamics performance and excellent cycle performance.

If the proportion of the anti-compression capability of the negative active material was less than 58%, the squeeze pressure performed on the negative electrode plate from the positive electrode plate was larger during the cycle process of the lithium-ion battery, because the negative active material had smaller anti-compression capability, the negative active material had larger deformation under the larger squeeze pressure, the porosity of the negative electrode plate was lower, the infiltration of the electrolyte into the negative electrode plate was worse, the intercalation resistance and the deintercalation resistance with respect to the lithium ions to the negative electrode plate were larger; and moreover, the interface compatibility between the negative electrode plate and the electrolyte was also worse, the contact impedance on the surface of the negative electrode plate continued to increase, which hindered the transmission of the lithium ions between the positive electrode plate and the negative electrode plate, thereby affecting the dynamics performance and the cycle performance of the lithium-ion battery. Furthermore, when the anti-compression capability of the negative active material was smaller, the rebound capability of the negative active material particles in morphology was also worse, the damage of the surface of the negative active material and the exfoliation of the negative electrode plate easily occurred, therefore the surface stability and the structural stability of the negative active material were worse, the surface stability and the structural stability of the negative electrode plate were also worse, finally the lithium precipitation window of the lithium-ion battery was narrowed, the lithium precipitation degree became more and more serious during the cycle process of the lithium-ion battery.

When the anti-compression capability of the negative active material was larger, the anti-compression capability of the positive active material was smaller and the proportion of the anti-compression capability of the negative active material was more than 72%, the anti-compression capability of the positive active material particles was worse, the probability of particle break of the positive active material and the probability of crystal structure damage of the positive active material increased during the cycle process of the lithium-ion battery, the surface integrity of the positive electrode plate was worse, which not only affected the capacity of the lithium-ion battery and accelerated the decay speed of the capacity of the lithium-ion battery during the cycle process, but also hindered the deintercalation and the intercalation of the lithium ions due to the crystal structure damage of the positive active material and in turn affected the dynamics performance of the lithium-ion battery. And moreover, the worse the anti-compression capability of the positive active material was, the lower the porosity of the positive electrode plate was, the worse the infiltration of the electrolyte into the positive electrode plate was, the larger the intercalation resistance and the deintercalation resistance with respect to the lithium ions to the positive electrode plate during the cycle process of the lithium-ion battery were; and furthermore, the interface compatibility between the positive electrode plate and the electrolyte was worse, the contact impedance on the surface of the positive electrode plate continued to increase, which also hindered the transmission of the lithium ions between the positive electrode plate and the negative electrode plate, and in turn affected the dynamics performance and the cycle performance of the lithium-ion battery.

According to the foregoing disclosure and teachings of the present disclosure, a person skilled in the art may also make variations and modifications to the above implementing manners. Therefore, the present disclosure is not limited to the specific implementing manners disclosed and described in the above, modifications and variations of the present disclosure will also be fallen within the scope of the claims of the present disclosure. Furthermore, although specific terminologies are used in the present disclosure, these terminologies are merely for convenience of description, and are not intended to limit the present disclosure.

What is claimed:

1. A lithium-ion battery comprising a positive electrode plate, a negative electrode plate, a separator and an electrolyte, the positive electrode plate comprising a positive current collector and a positive film, the positive film being provided on at least one surface of the positive current collector and comprising a positive active material, the negative electrode plate comprising a negative current collector and a negative film, the negative film being provided on at least one surface of the negative current collector and comprising a negative active material;
wherein
the positive active material comprises a material having a chemical formula of $Li_aNi_xCo_yM_zO_2$, $0.95 \leq a \leq 1.2$, $x>0$, $y \geq 0$, $z \geq 0$, M is one or two selected from a group consisting of Mn and Al;
a porosity of the positive film is 20% ~30%;
the negative active material comprises a graphite material;
the lithium-ion battery satisfies a relationship $62\% \leq KY_a/(KY_a+KY_c) \times 100\% \leq 68\%$;
$KY_a=10/\rho_a$, $\rho_a$ represents a compaction density of a powder of the negative active material under a pressure of 2000 kg, and a unit of $\rho_a$ is g/cm$^3$;
$KY_c=10/\rho_c$, $\rho_c$ represents a compacted density of a powder of the positive active material under a pressure of 2000 kg, and a unit of $\rho_c$ is g/cm$^3$;
the positive active material satisfies 3.02 cm$^3$/g $\leq KY_c \leq 3.40$ cm$^3$/g; and
the negative active material satisfies 5.35 cm$^3$/g$\leq KY_a \leq 6.64$ cm$^3$/g.

2. The lithium-ion battery according to claim 1, wherein an average particle size D50 of the positive active material is 2 μm~11 μm.

3. The lithium-ion battery according to claim 2, wherein the average particle size D50 of the positive active material is 2.5 μm~6.7 μm.

4. The lithium-ion battery according to claim 1, wherein an average particle size D50 of the negative active material is 6 μm~15.6 μm.

5. The lithium-ion battery according to claim 4, wherein the average particle size D50 of the negative active material is 6 μm~12.9 μm.

6. The lithium-ion battery according to claim 1, wherein a graphitization degree of the negative active material is 92%~96.2%.

7. The lithium-ion battery according to claim 6, wherein the graphitization degree of the negative active material is 92.1%~95.0%.

8. The lithium-ion battery according to claim 1, wherein a pressing density of the positive film is 3.1 g/cm$^3$~3.5 g/cm$^3$.

9. The lithium-ion battery according to claim 1, wherein a pressing density of the negative film is 1.3 g/cm$^3$~1.7 g/cm$^3$.

10. The lithium-ion battery according to claim 1, wherein a porosity of the negative film is 30%~40%.

11. The lithium-ion battery according to claim 1, wherein x+y+z=1.

12. The lithium-ion battery according to claim 1, wherein doping modification and/or coating modification are further performed on $Li_aNi_xCo_yM_zO_2$.

13. The lithium-ion battery according to claim 1, wherein the graphite material is one or more selected from a group consisting of artificial graphite, natural graphite and modified graphite.

14. The lithium-ion battery according to claim 1, wherein
the positive active material further comprises one or more selected from a group consisting of lithium cobalt oxide, lithium nickel oxide, layered lithium manganese oxide, spinel lithium manganese oxide, spinel lithium nickel manganese oxide and polyanion-type positive active material; and/or
the negative active material further comprises one or more selected from a group consisting of soft carbon, hard carbon, carbon fiber, mesocarbon microbeads, silicon-based material, tin-based material and lithium titanate.

* * * * *